Nov. 19, 1929.　　C. W. KURIE, JR　　1,735,928
MECHANICAL MOVEMENT
Filed May 28, 1927　　2 Sheets-Sheet 1
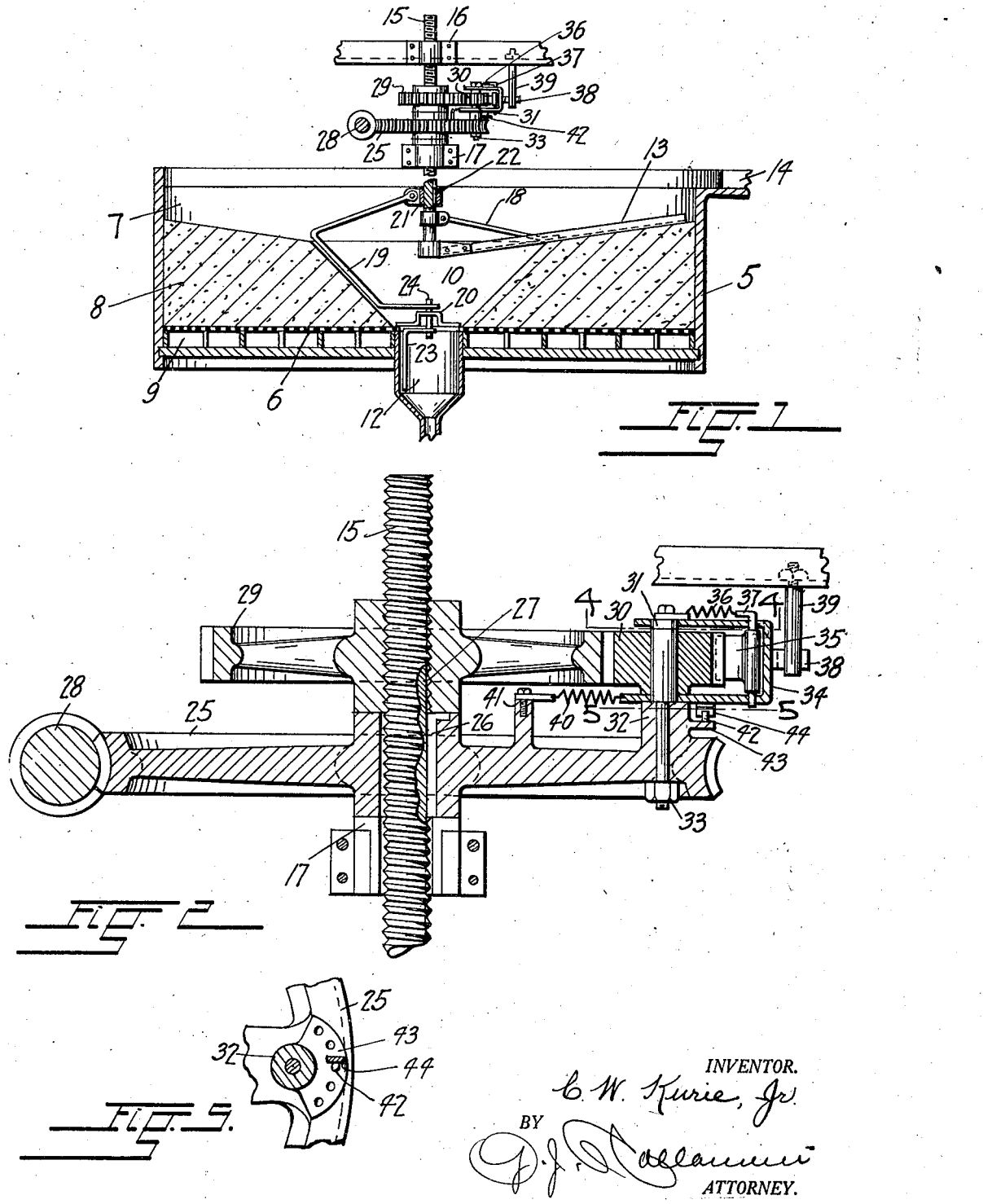
INVENTOR.
C. W. Kurie, Jr.
BY
ATTORNEY.

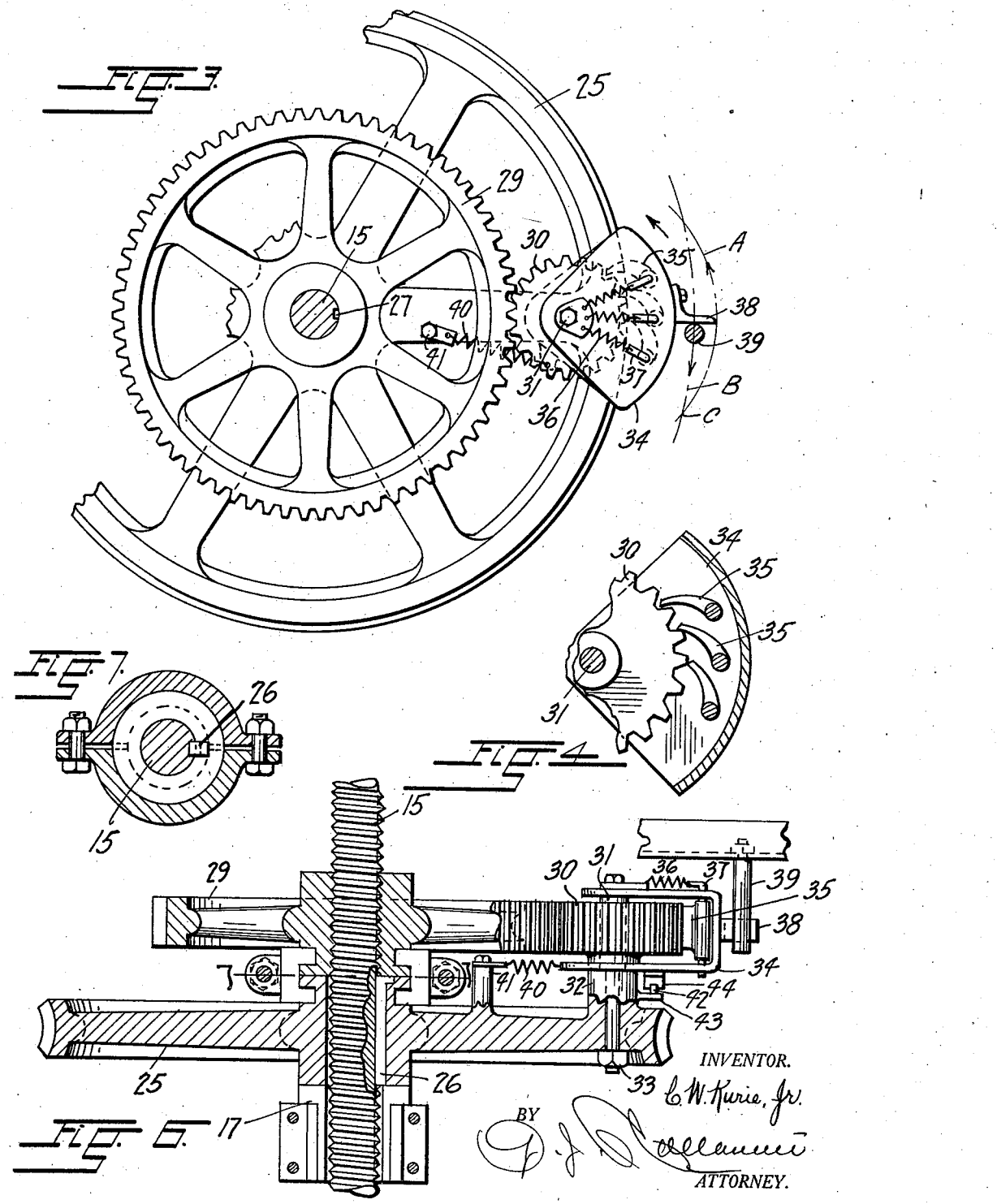

Patented Nov. 19, 1929

1,735,928

UNITED STATES PATENT OFFICE

CHARLES W. KURIE, JR., OF COLORADO SPRINGS, COLORADO, ASSIGNOR TO THE CYCLE COMPANY, OF COLORADO SPRINGS, COLORADO, A CORPORATION OF COLORADO

MECHANICAL MOVEMENT

Application filed May 28, 1927. Serial No. 194,979.

This invention relates to mechanical movements and its principal object is to provide a mechanism of simple construction in which a rotary driving action is combined with a rectilinear feed movement in the direction of the axis of rotation.

A further object of the invention is to provide in a mechanism of the above described character means to reverse the direction of the rectilinear movement so that a driven element subject to a downward feed may be lifted at the end of the operation, and still other objects reside in details of construction and novel arrangements and combinations of parts, as will be fully brought out in the following description with reference to the accompanying drawings.

The invention is particularly adapted for use in connection with filtering and thickening apparatus in which a rotary scraper moves subsided solids to a point of discharge together with the upper strata of the filtering medium on which the solids are supported.

In the drawings in the several views of which like parts are similarly designated, Figure 1 represents a sectional elevation of a thickener or filtering apparatus to which the invention is applied, Figure 2, an enlarged sectional elevation of the movement by itself, Figure 3, a fragmentary plan view of the same, Figure 4, a fragmentary section taken on the line 4—4 Figure 2, Figure 5, a fragmentary section along the line 5—5 Figure 2, Figure 6, a view similar to that of Figure 2 showing a modification in the construction of the movement, and Figure 7, a section on the line 7—7, Figure 6.

Referring further to the drawings, the thickening apparatus illustrated in Figure 1 comprises a preferably cylindrical tank 5 divided by a horizontal perforated partition 6 into an upper compartment 7 containing a filtering bed 8, and a lower compartment 9 in which in practice the liquid passing through the filter bed is received. The filter bed has a central funnel-shaped well or passage 10 in alinement with a duct 12 connected at the lower end thereof.

The passage provides an outlet for thickened solids subsided on the filter bed and removed therefrom by a rotary scraper 13, the discharge of the solids being usually expedited by a pump connected at the lower end of the duct. In order to maintain the filter bed in a condition of maximum efficiency, its fouled upper stratum is removed with the thickened solids and this is accomplished by a downward feed of the scraper at regular intervals.

A peripheral overflow 14 at the upper edge of the tank provides for the decantation of clear liquid rising above the settling solids.

The mechanism for operating the scraper as stated hereinbefore, comprises a screw-threaded shaft 15 suspended in suitable bearings 16 and 17 above the filter bed, as shown in Figure 1. The scraper 13 is connected at the lower end of the shaft and reenforced by braces 18 and a second scraper 19 may be provided in connection with the shaft to remove the discharged solids from the surface of the funnel-shaped well.

The second scraper is supported on a bearing 20 at the lower end of the well and it is necessary that its connection with the shaft should provide for the downward movement of the shaft for its feeding action upon the principal scraper. The connection may be established by a key on the shaft moving in a groove of the collar 21 by which the scraper is connected for rotation with the shaft, or by a key 22 on the collar sliding in a slot of the shaft.

The construction of the thickener may also include a third scraper 23 in the duct 12, connected with the spindle 24 by which the second scraper is supported on the bearing. A worm-wheel 25 supported on the bearing 17 is connected for rotation of the shaft by means of a key 26 fastened in the bore of its hub, the bore being sufficiently large to permit of relative lengthwise movement of the shaft. The key is slidably fitted in a longitudinal keyway 27 of the shaft, which if so desired may be extended to accommodate the key in the collar of the well-scraper 19 as stated hereinbefore.

The worm-wheel 25 is driven by a worm 28 connected with a conveniently disposed motor.

The lengthwise feeding movement of the shaft is produced at regular intervals in the rotary movement of the same by means of a nut-gear 29 which is supported on the hub of the driving wheel. The internal screw-thread in the hub of the gear wheel 29 cooperates with the tread of the shaft and its peripheral teeth mesh with those of a pinion 30 rotatably supported on a stud 31 fastened to a spoke of the driving wheel adjacent the periphery of the same.

The studs as shown in the drawing, consist of a shouldered pin inserted in an opening of a boss 32 on the wheel spoke and secured by a nut 33. A shroud lever 34 fulcrumed on the stud at opposite sides of the pinion carries one or more trunnioned pawls 35 which are held in driving engagement with the teeth of the pinion by springs 36 connected between laterally projecting arms 37 on the trunnions of the pawls and a relatively fixed part of the lever.

The shroud lever carries an outwardly projecting lug 38 for engagement with a stationary pin 39 disposed in the path thereof. It is the purpose of this pin to compel the lever to move about its fulcrum and through the medium of its pawls, effect a rotary movement of the pinion in a direction opposite to the rotary movement of the driving wheel.

The lever is returned to its original position after its lug has disengaged the pin 39, by a spring 40 which connects the lever with a fixed post 41 on the spoke of the driving wheel supporting the pinion. A stop pin 42 held on a shelf 43 of the boss of the spoke, on which the pinion is supported, limits the return movement of the lever by engagement with a lug 44 on the underside thereof and thereby determines the normal position of the lever.

In order to change this normal position of the lever and thus vary the period of its activity by engagement with the pin 39, the shelf of the boss on which the stop pin is supported has a number of holes in a curve concentric with the pinion, for adjustment of the stop pin, as illustrated in Figure 5 of the drawings.

In the construction as shown, the shroud lever is actuated once during each revolution of the drive wheel, but it will be understood that by placing two or more pins 39 in the path of the lug 38 on the lever, the lever may be operated as many times during each revolution of the wheel as may be required in accordance with the nature of the filter bed and of the material under treatment.

In the operation of the thickening and filtering apparatus, the power wheel 25 is rotated at a constant velocity by the worm 28 and its rotary motion is transmitted by the key 26 to the shaft 15 of the scraper. The feed pinion 30 being carried on the drive wheel, revolves with it as a union and the gear nut 29 rotates with the shaft at equal velocity.

When the lug on the shroud lever engages the stationary pin 39, the lever is compelled to move about the stud 31 in a direction indicated at A in Figure 3, while the worm wheel continues its movement in the direction B. The pawls engaging the teeth of the pinion cause it to rotate in the direction A until the lug disengages the pin at the point of intersection of the two arcs of rotation indicated at C in Figure 3, when the spring 40 returns the shroud lever to its original position in which its lug 44 engages the stop pin 42.

The rotary movement of the pinion causes the nut gear 29 to revolve in the direction of rotation of the shaft but at a speed slightly in excess of that of the worm wheel, with the result that the nut gear is unscrewed and the shaft is allowed to move downwardly by gravity.

It will be seen that by changing the position of the stop pin on the shelf on which it is supported, the period during which the pawls are in impellent engagement with the feed pinion may be varied, thereby enlarging or reducing the angle through which the pinion is rotated and correspondingly varying the feed movement of the shaft.

The pawls are arranged on the lever so that they may swing clear of the teeth of the feed pinion during return movement of the lever, while being maintained in their relative operative position by their springs 36. When three pawls are used as in the construction shown in the drawings, they are positioned so as to engage the teeth of the pinion consecutively.

By proper adjustment of the stop pin, the movement of the feed pinion can thus be regulated from one-third of a tooth onward. In case it is desired to lift the scraper as, for example, at the end of the operation or for renewal of the filter bed, the feed movement of the shaft may be reversed by reversing the position of the pawls on the shroud lever which is readily accomplished either by turning the lever upside down or by providing pawls having two points at opposite sides of their pivotal axes.

The same result may also be obtained by securing the nut gear against rotation disengaging the pawls and continuing the driving movement of the worm wheel in clockwise direction.

In the modified construction illustrated in Figure 6 the nut gear 29 is locked on the drive wheel 25 against relative vertical displacement by means of a two part collar embracing flanges at the contiguous ends of the hubs of the wheels. The shaft in this case, does not feed by gravity but by its rotary movement in the nut when the latter is rotated at a different velocity from the drive wheel by action of the pawls on the lever, upon the feed pinion while the lug on the lever engages the stationary pin.

It will be seen that by connecting the two wheels for conjoint vertical movement by means of the drag collar, differential rotation of the nut wheel will tend to draw the drive wheel upwardly and thereby effect a positive mechanically produced downward movement of the screw-threaded shaft.

Having thus described my invention, what I claim and desire to secure by Letters Patent is:—

1. A mechanical movement of the character described comprising a rotary drive wheel, a screw-threaded shaft connected for rotation by the drive wheel but capable of relative lengthwise motion, a toothed nut on the shaft, a feed pinion on the drive wheel meshing with the nut, a lever fulcrumed on the drive wheel, a pawl on the lever in driving relation to the feed pinion, and an abutment disposed to be engaged by the lever during rotation of the drive wheel.

2. A mechanical movement of the character described comprising a rotary drive wheel, a screw-threaded shaft connected for rotation by the drive wheel but capable of relative lengthwise motion, a toothed nut on the shaft, a feed pinion on the drive wheel meshing with the nut, a spring-controlled lever fulcrumed on the drive wheel, a pawl on the lever in driving relation to the feed pinion, and an abutment disposed to be engaged by the lever during rotation of the drive wheel.

3. A mechanical movement of the character described comprising a rotary drive wheel, a screw-threaded shaft connected for rotation by the drive wheel but capable of relative lengthwise motion, a toothed nut on the shaft, a feed pinion on the drive wheel meshing with the nut, a lever fulcrumed on the drive wheel, a reversible pawl on the lever in driving relation to the feed pinion, and an abutment disposed to be engaged by the lever during rotation of the drive wheel.

4. A mechanical movement of the character described, comprising a shaft having a screw-threaded portion, a driving member on the shaft, coupling means permitting axial movement of the shaft while maintaining driving relation between it and the driving member, a nut on the screw-threaded portion of the shaft and normally stationary relatively to the shaft, means for periodically acting upon the nut to cause angular motion between it and the shaft, and means for varying the extent of the angular motion.

5. A mechanical movement of the character described, comprising a shaft having a screw-threaded portion, a driving member on the shaft, coupling means permitting axial movement of the shaft while maintaining driving relation between it and the driving member, a nut on the screw-threaded portion of the shaft and normally stationary relatively to the shaft, means for periodically acting upon the nut to cause angular motion between it and the shaft, and means for varying the extent of the angular motion, including gear mechanism carried by the driving member and engaging the nut, means operative to periodically actuate the gear mechanism so as to cause angular motion between the nut and the shaft and means for varying the extent of the angular motion.

6. A mechanical movement of the character described, comprising a shaft having a screw-threaded portion, a driving member on the shaft, coupling means permitting axial movement of the shaft while maintaining driving relation between it and the driving member, a nut on the screw-threaded portion of the shaft and normally stationary relatively to the shaft, means for periodically acting upon the nut to cause angular motion between it and the shaft, and means for varying the extent of the angular motion, including gear mechanism carried by the driving member and engaging the nut, means permitting the gear mechanism to freely rotate in one direction and restraining its against rotary movement in the opposite direction, a stationary abutment disposed outside the path of motion of the gear mechanism and means connected with the gear mechanism for coming into abutting relation with said abutment during each revolution of the driving member.

7. A mechanical movement of the character described, comprising a shaft having a screw-threaded portion, a driving member on the shaft, coupling means permitting axial movement of the shaft while maintaining driving relation between it and the driving member, a nut on the screw-threaded portion of the shaft and normally stationary relatively to the shaft, means for periodically acting upon the nut to cause angular motion between it and the shaft and means for varying the extent of the angular motion, including gear mechanism carried by the driving member and engaging the nut, means connected with the gear mechanism for imparting to it a limited rotary movement in one direction once during each revolution of the driving member and means for restraining the gear mechanism against rotary movement in opposite direction.

8. A mechanical movement of the character described, comprising a shaft having a screw-threaded portion, a driving member on the shaft, coupling means permitting axial movement of the shaft while maintaining driving relation between it and the driving member, a nut on the screw-threaded portion of the shaft and normally stationary relatively to the shaft, means for periodically acting upon the nut to cause angular motion between it and the shaft and means for varying the extent of the angular motion, including gear mechanism carried by the driving member and engaging the nut, means connected with the gear mechanism for imparting to it a limited rotary movement in one direction once during each revolution of the driving member, spring means positioned to oppose said limited angular movement and means for restraining the gear mechanism against rotary movement in opposite direction.

9. A mechanical movement of the character described, comprising a shaft having a screw-threaded portion, a driving member on the shaft, coupling means permitting axial movement of the shaft while maintaining driving relation between it and the driving member, a nut on the screw-threaded portion of the shaft and normally stationary relatively to the shaft, means for periodically acting upon the nut to cause angular motion between it and the shaft and means for varying the extent of the angular motion, including gear mechanism mounted upon the driving mechanism for free rotary movement thereon, pawl mechanism for engagement with the gear mechanism, a frame carrying the pawl mechanism, said frame being pivotally mounted concentrically with the gear mechanism, spring means positioned to oppose rotary movement of the frame in one direction and means for imparting to the frame a limited angular movement against the opposition of the spring means, including a member projecting outwardly from the frame and a stationary abutment in the path of motion of the projecting member.

In testimony whereof I have affixed my signature.

CHARLES W. KURIE, Jr.